(12) United States Patent
Hartung

(10) Patent No.: US 9,371,733 B2
(45) Date of Patent: Jun. 21, 2016

(54) ROTOR BLADE ARRANGEMENT FOR A TURBO MACHINE

(75) Inventor: Andreas Hartung, Munich (DE)

(73) Assignee: MTU Aero Engines GmbH, Munich (DE)

( * ) Notice: Subject to any disclaimer, the term of this patent is extended or adjusted under 35 U.S.C. 154(b) by 553 days.

(21) Appl. No.: 13/885,311

(22) PCT Filed: Nov. 5, 2011

(86) PCT No.: PCT/DE2011/001964
§ 371 (c)(1),
(2), (4) Date: Jun. 24, 2013

(87) PCT Pub. No.: WO2012/065595
PCT Pub. Date: May 24, 2012

(65) Prior Publication Data
US 2013/0280083 A1    Oct. 24, 2013

(30) Foreign Application Priority Data

Nov. 16, 2010  (DE) .......................... 10 2010 051 529
Feb. 8, 2011   (EP) ...................................... 11153621

(51) Int. Cl.
*F01D 5/12*    (2006.01)
*F01D 5/16*    (2006.01)

(52) U.S. Cl.
CPC .. *F01D 5/12* (2013.01); *F01D 5/16* (2013.01); *F05D 2250/241* (2013.01); *Y02T 50/671* (2013.01); *Y10T 29/49336* (2015.01)

(58) Field of Classification Search
CPC ....... F01D 5/12; F01D 5/16; F05D 2250/241; Y02T 50/671; Y10T 29/49336
See application file for complete search history.

(56) References Cited

U.S. PATENT DOCUMENTS

| | | | |
|---|---|---|---|
| 1,398,062 A * | 11/1921 | Brooks ................... | B64C 11/24 416/145 |
| 1,833,751 A | 11/1931 | Kimball | |
| 1,833,754 A | 11/1931 | Paget | |
| 2,349,187 A | 5/1944 | Meyer | |
| 2,651,494 A | 9/1953 | Persson Thure et al. | |
| 2,828,941 A | 4/1958 | Foley | |
| 2,862,686 A | 12/1958 | Bartlett | |
| 2,997,274 A | 8/1961 | Hanson | |
| 3,027,138 A | 3/1962 | Howell Alun et al. | |
| 4,917,574 A * | 4/1990 | Dodd ......................... | F01D 5/16 416/190 |
| 5,232,344 A * | 8/1993 | El-Aini ..................... | F01D 5/16 416/145 |
| 6,139,263 A | 10/2000 | Klingels | |
| 6,681,486 B2 | 1/2004 | Flower | |

(Continued)

FOREIGN PATENT DOCUMENTS

| | | |
|---|---|---|
| CH | 660 207 | 3/1987 |
| DE | 19807247 | 9/1999 |

(Continued)

*Primary Examiner* — Igor Kershteyn
(74) *Attorney, Agent, or Firm* — Davidson, Davidson & Kappel, LLC

(57) ABSTRACT

In a moving blade system for a turbomachine, in particular a gas turbine, having at least one moving blade (1), the moving blade system having at least one cavity (3) in which at least one tuning mass (2) is movably situated, the tuning mass and/or the cavity is/are adapted in such a way that the tuning mass rests against an inner wall (3.1) of the cavity in a predefined first operating state of the turbomachine and at least temporarily moves away from the inner wall in a second predefined operating state of the turbomachine.

11 Claims, 1 Drawing Sheet

(56) References Cited

U.S. PATENT DOCUMENTS

| | | |
|---|---|---|
| 6,827,551 B1 | 12/2004 | Duffy et al. |
| 7,249,769 B2 | 7/2007 | Webster |
| 8,226,364 B2 * | 7/2012 | Manfredotti .......... B64C 27/001 416/106 |
| 2004/0188943 A1 | 9/2004 | Beichl et al. |

FOREIGN PATENT DOCUMENTS

| | | |
|---|---|---|
| DE | 10122732 | 11/2002 |
| DE | 60020884 | 5/2006 |
| DE | 60116455 | 7/2006 |
| DE | 102007010378 | 9/2008 |
| DE | 10 2009 010 185 | 8/2010 |
| EP | 1564375 | 8/2005 |
| EP | 1 892 377 | 2/2008 |
| FR | 981599 | 5/1951 |
| FR | 1024218 | 3/1953 |
| FR | 1 263 677 | 6/1961 |
| GB | 2 223 277 | 4/1990 |
| WO | WO 2010/094277 | 6/2011 |

\* cited by examiner

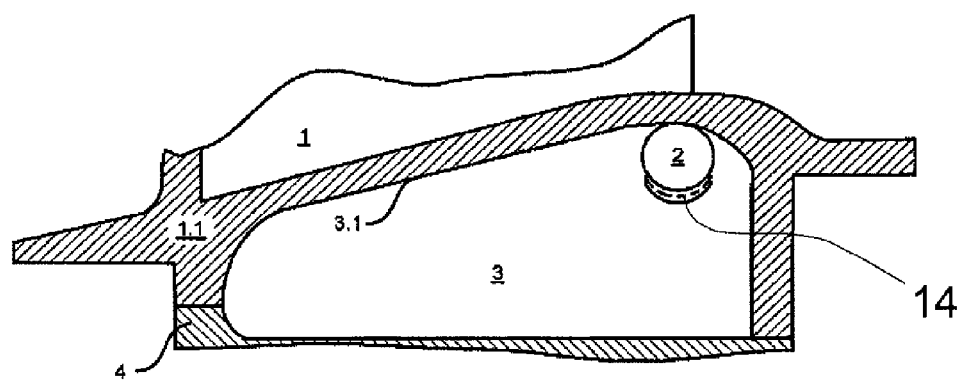

ROTOR BLADE ARRANGEMENT FOR A TURBO MACHINE

The present invention relates to a moving blade system for a turbomachine, in particular a gas turbine which has a cavity in which a moving mass is situated, a turbomachine and a method for designing a moving blade system of this type.

BACKGROUND

Moving blades of turbomachines, in particular gas turbines, are susceptible to oscillations, as a result of their elasticity and excitation, in particular due to the working fluid flowing through them as well as mechanical vibrations. If natural frequencies of the moving blades are excited, the resonance may cause damage to the turbomachine, in particular to the moving blades, and thus reduce the service life.

U.S. Pat. No. 2,862,686 therefore proposes to provide moving spheres inside hollow blades. Throughout the entire operation, the centrifugal force presses the spheres in their wedge-shaped guide radially to the outside, where they form a rib and thereby stiffen the blade. If the blade expands as a result of heating, the spheres subsequently slide on the inner wall of the blade cavity and thus adapt thereto. The spheres are designed exclusively with regard to the stiffening effect.

A blade system is known from DE 10 2009 010 185 A1 of the applicant. Accordingly, disk-shaped damping elements, which are freely movably situated in cavities in the blade system, carry out frictional knocks against each other and against the inner wall and dissipate oscillation energy from the system in this way. The damping elements in this case are designed with regard to their damping effect.

SUMMARY OF THE INVENTION

It is an object of the present invention to improve the oscillation behavior of turbomachines.

The present invention provides that the natural frequencies of a system are determined, in particular, by the system's mass or mass distribution. If one or multiple masses is/are decoupled in a system shortly before reaching a natural frequency of coupled masses, or conversely, if one or multiple masses is/are added, the natural frequency of a system which has been structurally modified in this way changes abruptly, making it possible to traverse the natural frequency of the original system without resonance. After traversing this frequency, the masses which were decoupled or coupled for the purpose of tuning the natural frequencies may be coupled or decoupled again, and the system may be operated in an operating state above its traversed natural frequency.

A moving blade system according to the present invention has one or multiple detachable or non-detachable, in particular integrally connected, moving blades. For the sake of a more concise representation, a single moving blade is also generally referred to in the present case as a moving blade system in the sense of the present invention. So-called moving blade clusters, i.e., two or more interconnected moving blades, as well as complete moving grids, in particular so-called BLISKs (blade-integrated disks), are referred to as a moving blade system.

The moving blade system has one or multiple cavities, which may be designed to be open or closed. In particular, one or multiple cavities may be provided in each vane of a moving blade or in one, multiple or all vanes of interconnected moving blades. Additionally or alternatively, one or multiple cavities may be provided in an inner and/or an outer ring of a moving blade or multiple interconnected moving blades. One or multiple cavities, which preferably communicate with each other, are particularly advantageously provided a least partially in and/or under the so-called platform of one or multiple interconnected blades. In this sense, a moving blade system in the sense of the present invention may also include part of a rotor to which the moving blade system is fastened and in which one or multiple of the cavities is/are at least partially provided. The provision of one or multiple cavities at least partially under the platform of one or multiple blades may be advantageous, in particular with regard to manufacturing and maintenance.

One or more tuning masses is/are movably situated in one or multiple of the aforementioned cavities. The tuning masses may be situated in an unbound manner, i.e., freely movable and loose, in the particular cavity. Likewise, they may be guided in at least one direction, preferably in the axial and/or circumferential direction, so that they are able to move, for example, only in the radial direction. A guide may also be provided, in particular in a form-locked manner, for example by one or multiple, in particular radial, channels in which tuning masses are movably guided. Likewise, one or multiple tuning masses may also be elastically supported in the particular cavity, for example by connecting them, i.e., detachably or non-detachably fastening them, to the cavity with the aid of one or multiple elastic structures, for example leaf springs. In one preferred refinement, two or more of the aforementioned aspects are combined, for example by additionally elastically supporting or restraining a tuning mass, which is guided in a form-locked manner in a radial channel, in the radial direction with the aid of a pressure spring-like or torsion spring-like structure.

According to the present invention, as explained above, it is provided according to a first aspect that one or multiple of these tuning masses, which rest against an inner wall of the particular cavity during operation of the turbomachine as a result of the centrifugal force, at least briefly and in particular abruptly move(s) away from the inner wall shortly before the blade system reaches a predefined natural frequency with the adjacent tuning mass or adjacent tuning masses, and these tuning masses thus tune the natural frequency of the blade system at least until they again come to rest against the inner wall. According to a second aspect, it is additionally or alternatively provided that one or multiple of these tuning masses, which are positioned at a distance from the inner wall of the particular cavity during operation of the turbomachine, in particular due to their elastic support, at least temporarily and, in particular, abruptly rest against the inner wall, as a result of the centrifugal force, shortly before the blade system reaches a predefined natural frequency with the spaced-apart tuning mass or spaced-apart tuning masses, and the tuning masses, in turn, thus tune the natural frequency of the blade system, at least until they move away from the inner wall.

For this purpose, the tuning mass(es), the cavity and/or an elastic support of the tuning mass(es) is/are adapted in such a way that the tuning mass rests against an inner wall of the cavity in a predefined first operating state of the turbomachine and at least temporarily moves away from the inner wall in a second predefined operating state of the turbomachine. The first or second operating state is preferably proximate to a natural frequency of the moving blade system having a tuning mass or tuning masses which rest(s) against the inner wall or is/are positioned at a distance therefrom. A proximate operating state is understood to be, in particular, an operation of the turbomachine which is in the range of 0.9 times to 0.99 times the corresponding natural frequency.

To adapt a tuning mass according to the present invention, its mass, its shape, its surface, in particular its coefficient of friction and/or its surface hardness and/or surface rigidity, its center of gravity and/or its inertia tensor, in particular, may be suitably predefined. In one preferred embodiment, a tuning mass has a spherical shape. The inner wall of a cavity may be adapted, in particular, in its shape and/or surface, it being advantageous to adapt the tuning mass and inner wall to each other with regard to their shape and/or surface. If a tuning mass is elastically supported or restrained in the cavity, this support or restraint is preferably also adapted.

The adaptation of the tuning mass, inner wall and possibly elastic support to the moving blade system, in particular to its natural frequencies, and to the operating states of the turbomachine may take place both numerically, in particular with the aid of simulation, and empirically with the aid of tests. In one preferred embodiment of a method according to the present invention, different tuning masses are consecutively introduced into a cavity and tested during operation of the turbomachine to see whether they perform the desired natural frequency tuning. For this purpose, it is advantageous, in particular, if the tuning mass(es), in one preferred embodiment, may be nondestructively removed from a cavity provided between rotor and platform, for example after the blade platform has been removed from the rotor.

A tuning mass may be detached, in particular, by vibrations which occur during operation shortly before the moving blade system reaches a natural frequency with an adjacent tuning mass. In such a case, the centrifugal force drives the tuning mass back against the inner wall, which it contacts in one or multiple fully elastic or partially plastic knocks. In one preferred embodiment, the tuning mass and the cavity are adapted accordingly, in particular by shaping the surface accordingly.

A moving blade according to the present invention may be used, in particular, in a turbine (stage) or a compressor or a compressor stage of a gas turbine, in particular in an aircraft engine. They are preferably used in low pressure stages.

BRIEF DESCRIPTION OF THE DRAWINGS

Other features and advantages result from the subclaims and the exemplary embodiment. For this purpose, the single, partially schematic drawing shows the following:

FIG. 1 shows an axial sectional view of the platform of a moving blade having a tuning mass according to one embodiment of the present invention.

FIG. 1 shows an axial sectional view of platform 1.1 of an only partially illustrated moving blade 1 according to one embodiment of the present invention. This platform is fastened to an also only partially illustrated rotor 4 in a way which is not illustrated in further detail. A closed cavity 3 is provided between platform 1.1 and rotor 4, i.e., on the inner ring of the moving blade which is formed by platform 1.1. This cavity 3 is defined by the outside of rotor 4 and the underside of platform 1.1 and may be opened by removing blade 1 from rotor 4.

A spherical tuning mass 2 is freely movably situated in cavity 3. The shapes of cavity 3 and tuning mass 2 are adapted to each other in such a way that the tuning mass is pressed against radially external inner wall 3.1 of cavity 3 by the centrifugal force during operation of the turbomachine, i.e., while rotor 4 rotates, where the tuning mass wanders axially at its one end (on the right in FIG. 1) due to the wedge-shaped inner wall.

Vibrations of blade 1 occur when the rotor rotational speed approaches a certain natural frequency of moving blade 1 with tuning mass 2, which rests against the platform underside 3.1 of moving blade 1 as a result of the centrifugal force, for example the first natural bending frequency or natural torsional frequency. The mass of tuning mass 2 is adapted or predefined or selected, in particular, in such a way that the tuning mass abruptly, i.e., briefly, moves away from platform underside 3.1 of blade 1 as a result of these vibrations before the centrifugal force drives it back again. By moving away, the tuning mass is decoupled from blade 1 in such a way that the natural frequencies of the blades change abruptly, this time without an adjacent or coupled tuning mass. In this way, the natural frequency of moving blade 1 having a contacting tuning mass 2 may be traversed without ongoing and thus hazardous resonance occurring. It is harmless for the present invention if resonance occurs temporarily; in the aforementioned exemplary embodiment whenever tuning mass 2 rests again against platform underside 3.1 after a knocking contact, since it moves away again from there at least briefly, due to the vibrations, as a result of its selected mass and thus, in any case, prevents excessive buildup or instigation of the resonance. An optional leaf spring 14 connected to the tuning mass 2 as described above is shown schematically.

What is claimed is:

1. A moving blade system for a turbomachine, comprising:
at least one moving blade; and
at least one tuning mass movably situated in at least one cavity of the moving blade system,
at least one of the tuning mass and the cavity being adapted so that the tuning mass rests against an inner wall of the cavity in a predefined first operating state of the turbomachine and at least temporarily moves away from the inner wall in a second predefined operating state of the turbomachine,
wherein one of the first and second predefined operating states is proximate to a natural frequency of the moving blade system having a tuning mass resting against the inner wall or positioned at a distance therefrom, wherein the proximate operating state is between 0.9 to 0.99 times of the natural frequency of the moving blade.

2. The moving blade system as recited in claim 1 wherein the adaptation is of at least one of the following: a mass, shape, surface, center of gravity or inertia tensor of the tuning mass, a shape of the inner wall, and a surface of the inner wall.

3. The moving blade system as recited in claim 1 wherein the tuning mass is elastically supported in the cavity, the tuning mass and its elastic support being adapted in such a way that the tuning mass rests against the inner wall in the first operating state and is at least temporarily positioned a distance from the inner wall in the second operating state.

4. The moving blade system as recited in claim 1 wherein at least one of the tuning mass and the cavity is adapted in such a way that the tuning mass carries out knocks against the inner wall in the predefined operating state of the turbomachine.

5. The moving blade system as recited in claim 1 wherein the at least one moving blade includes a plurality of moving blades and the moving bade system includes an outer ring, the plurality of blades, and an inner ring, and wherein the cavity is provided in or on one of the inner ring and the outer ring.

6. The moving blade system as recited in claim 5 wherein the at least one moving blade includes a plurality of moving blades, and wherein the cavity is under a platform of one of the moving blades of the moving blade system.

7. The moving blade system as recited in claim 1 wherein the at least one moving blade includes a plurality of moving blades, each having a corresponding vane, and wherein the cavity is provided in one of the vanes.

8. A turbomachine comprising at least one moving blade system as recited in claim 1.

9. A gas turbine comprising the turbomachine as recited in claim 8.

10. A method for designing the moving blade system as recited in claim 1 wherein at least one of the at least one tuning mass and the cavity accommodating the tuning mass is adapted in such a way that the tuning mass rests against the inner wall in the predefined first operating state of the turbomachine and at least temporarily moves away from the inner wall in the second operating state.

11. A method for operating the moving blade system as recited in claim 1 comprising:
   resting the tuning mass against the inner wall in a first operating state; and
   at least temporarily moving the tuning mass away from the inner wall in the second operating state.

* * * * *